United States Patent
Cooke

(10) Patent No.: US 10,177,578 B2
(45) Date of Patent: Jan. 8, 2019

(54) POWER DISTRIBUTION DEVICE FOR USE WITH PORTABLE BATTERY

(71) Applicant: Jason Cooke, Belgrade, ME (US)

(72) Inventor: Jason Cooke, Belgrade, ME (US)

(*) Notice: Subject to any disclaimer, the term of this patent is extended or adjusted under 35 U.S.C. 154(b) by 9 days.

(21) Appl. No.: 15/665,481

(22) Filed: Aug. 1, 2017

(65) Prior Publication Data

US 2018/0041049 A1 Feb. 8, 2018

Related U.S. Application Data

(60) Provisional application No. 62/369,881, filed on Aug. 2, 2016.

(51) Int. Cl.
*H02J 7/00* (2006.01)
*G06F 1/16* (2006.01)

(52) U.S. Cl.
CPC ........ *H02J 7/0013* (2013.01); *G06F 1/1635* (2013.01); *H02J 7/0044* (2013.01); *H02J 7/0003* (2013.01)

(58) Field of Classification Search
CPC ...... H02J 7/0013; H02J 7/0044; H02J 7/0003; G06F 1/1635
USPC .............................................................. 429/7
See application file for complete search history.

(56) References Cited

U.S. PATENT DOCUMENTS

| 4,555,451 A | 11/1985 | Harrod et al. |
| 5,643,693 A * | 7/1997 | Hill ............... H01M 2/1083 429/121 |
| 6,442,017 B1 | 8/2002 | Ewing et al. |
| 6,793,534 B2 | 9/2004 | Cheng et al. |

* cited by examiner

*Primary Examiner* — Gary D Harris
(74) *Attorney, Agent, or Firm* — Jeffrey Joyce, Esq.

(57) ABSTRACT

A power distribution device for use with rechargeable batteries, such as power tool batteries or battery packs, that is capable of powering a number of accessory devices such as geographical positioning system devices, depth finders, phones and radios.

10 Claims, 13 Drawing Sheets

POWER DISTRIBUTION DEVICE FOR USE WITH PORTABLE BATTERY

BACKGROUND INFORMATION

Field of the Invention

The invention relates to power distribution devices and fuse blocks that operate in conjunction with portable batteries.

Discussion of Prior Art

Power distribution systems and fuse blocks are well known, and are traditionally used to distribute electricity from a power source to a number of other devices. Typically, these devices are either hard wired into a power grid or connected to a large battery that is itself connected to some sort of motor or engine that charges the battery while in use, such as in automobiles, motorcycles and large powerboats. All of these systems are large and require a connection to some form of electrical generator.

What is needed, therefore, is a power distribution system that works with a battery that is easily portable and rechargeable.

BRIEF SUMMARY OF THE INVENTION

The invention is a direct current power distributor and/or fuse block for use with rechargeable batteries such as power tool batteries or battery packs. The invention is suitable for any number of uses and situations, such as for use in small workshops or at remote locations, but is ideally suited for use as a permanent fixture in a small watercraft such as a canoe, kayak, rowboat or boats with motors that do not have a marine battery or have a marine battery that is located in an inconvenient position. In this scenario, the inventive device allows for the operation of, for example, led lighting, bilge pumps, search lights, fish finders, depth sounders, phone chargers, or any other low voltage direct current equipment, while offering the ease and simplicity of using rechargeable power tool batteries as the power source.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

Figure 1:
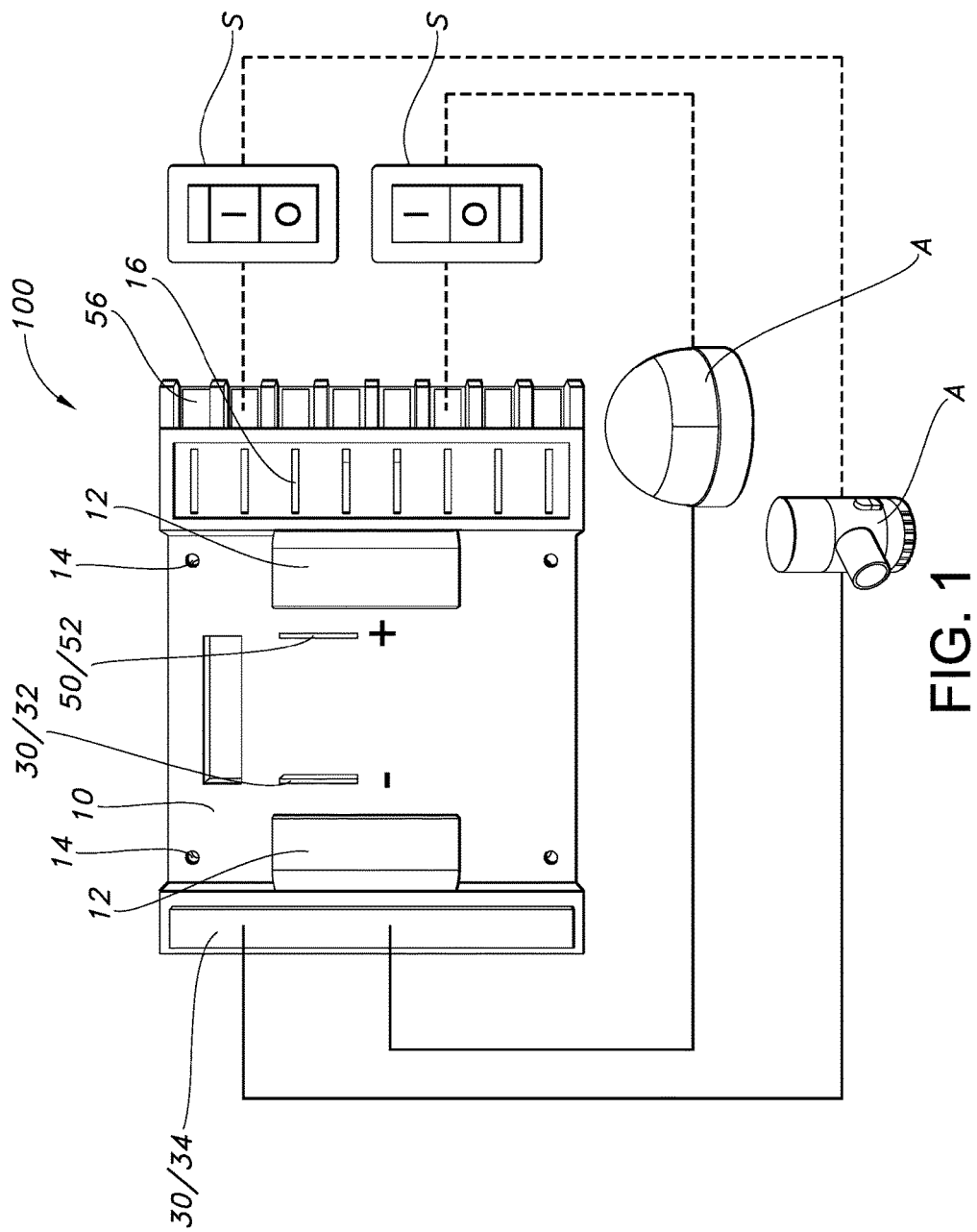
FIG. 1 is a top view of the device according to the invention connected to two other devices.
Figure 2:
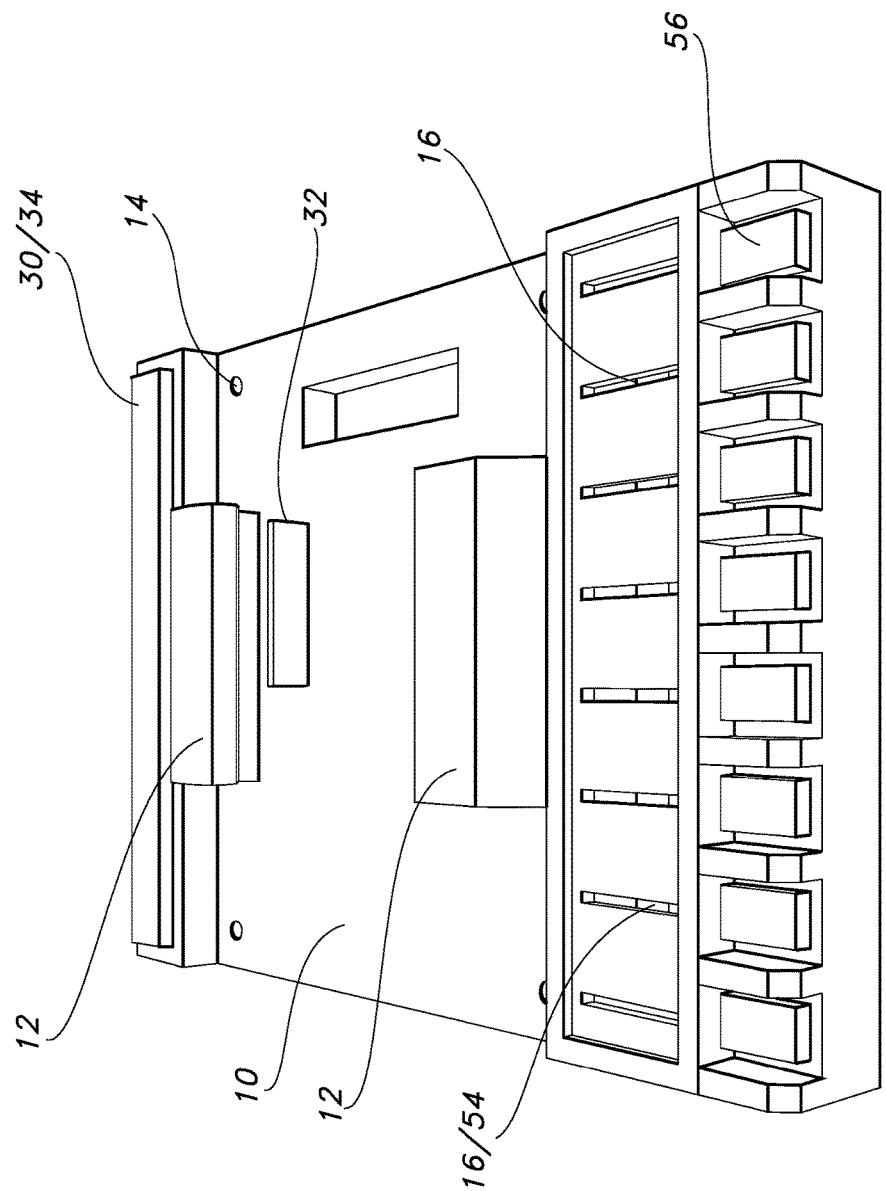
FIG. 2 is a top perspective view of the device.
Figure 3:
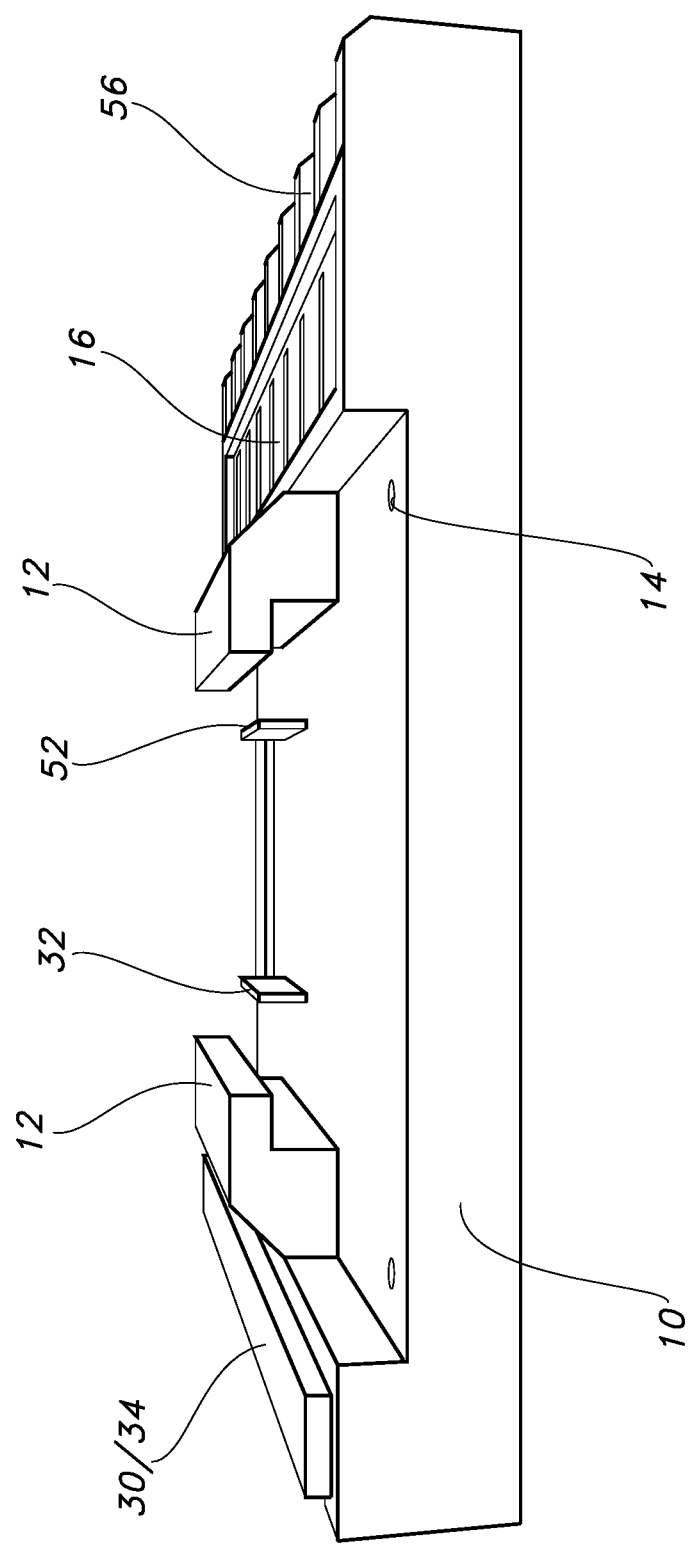
FIG. 3 is a side view of the device.
Figure 4:
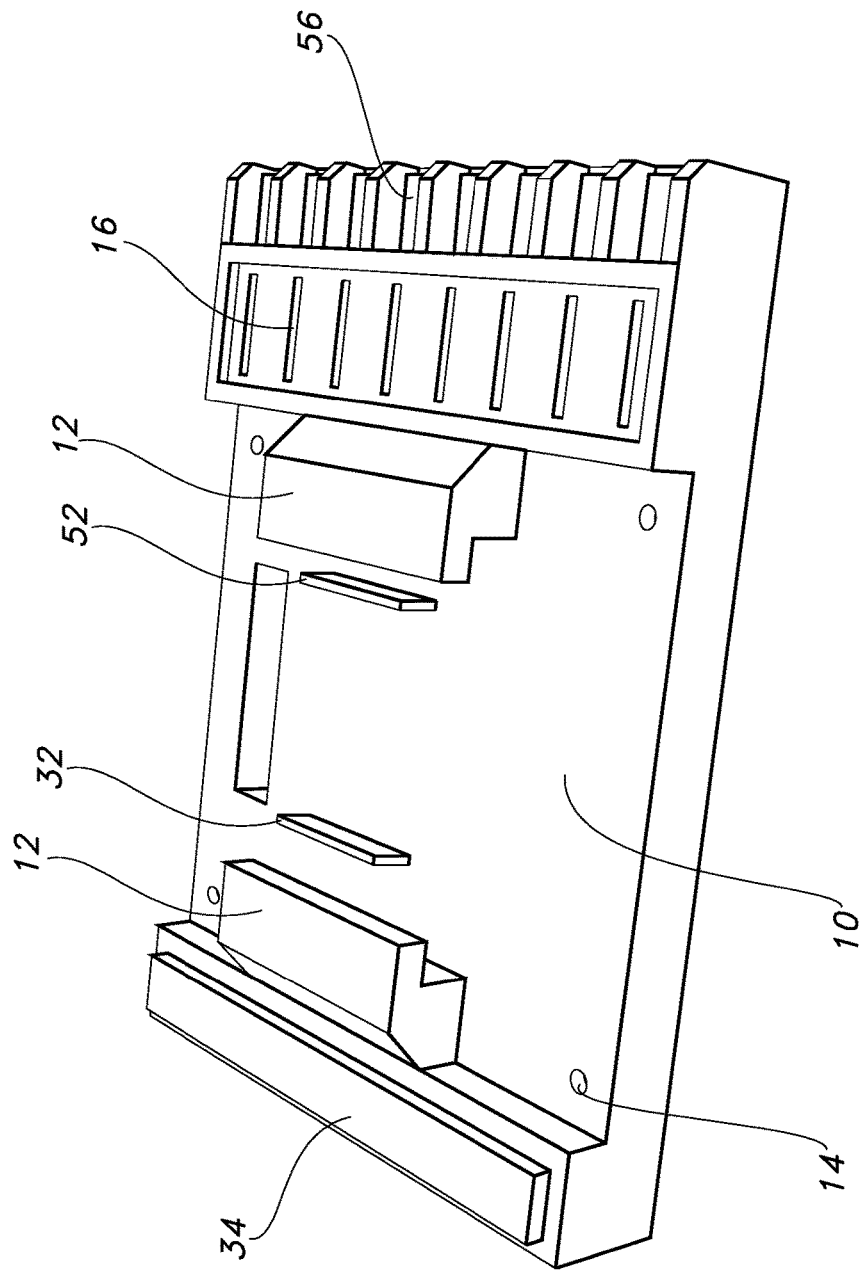
FIG. 4 is top perspective view of the device.

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

FIGS. 1-8 illustrate the power distribution device 100 according to the invention comprising a housing 10 and two electrical connectors 30, 50. The housing is a made of a non-conductive material and includes a battery connector 12 for securely holding a portable rechargeable battery (not shown). In the embodiment shown, the battery connector 12 is in the form of two battery attachment clips 12. The size and shape of the battery connector 12 may vary depending on the type of battery a particular embodiment is designed to work with.

The housing 10 also has one or more attachment openings 14, best shown in FIG. 1, that allow for the device to be affixed to another structure, for example, to a boat or workshop, with common fasteners (not shown) such as screws or bolts and nuts. Attaching a portable battery to the device 100 with the battery connector 12 causes a negative charge to pass to one of the electrical connectors 30 and a positive charge to pass to the second electrical connector 50. Accessory devices A that require low voltage direct current such as bilge pumps, fish finders, depth sounders, and phone chargers may be connected to the connectors 30, 50 to draw electricity from the battery. A switch S may be provided to open and close the flow of electricity from the battery to the accessory device A.

Figure 5:
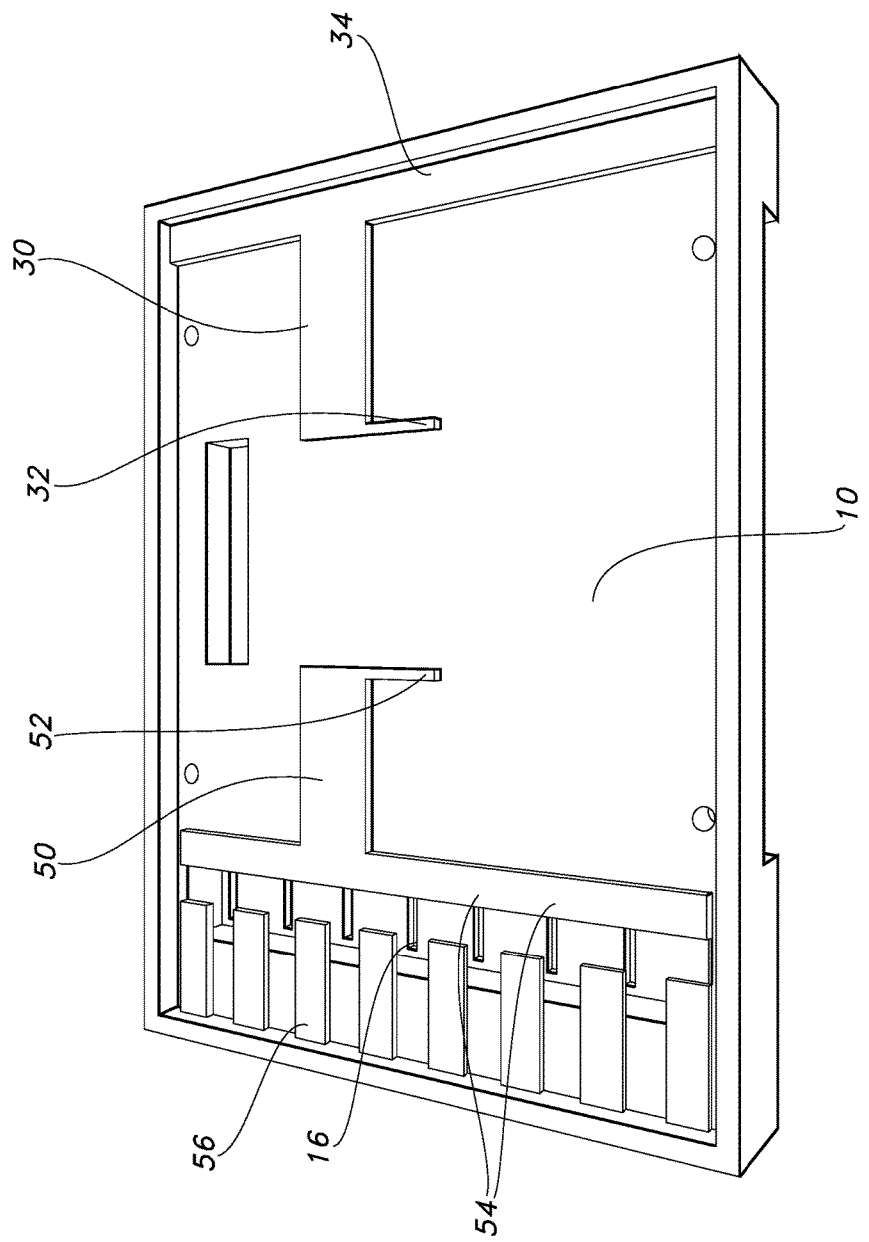
FIG. 5 is a bottom view of the device.
Figure 6:
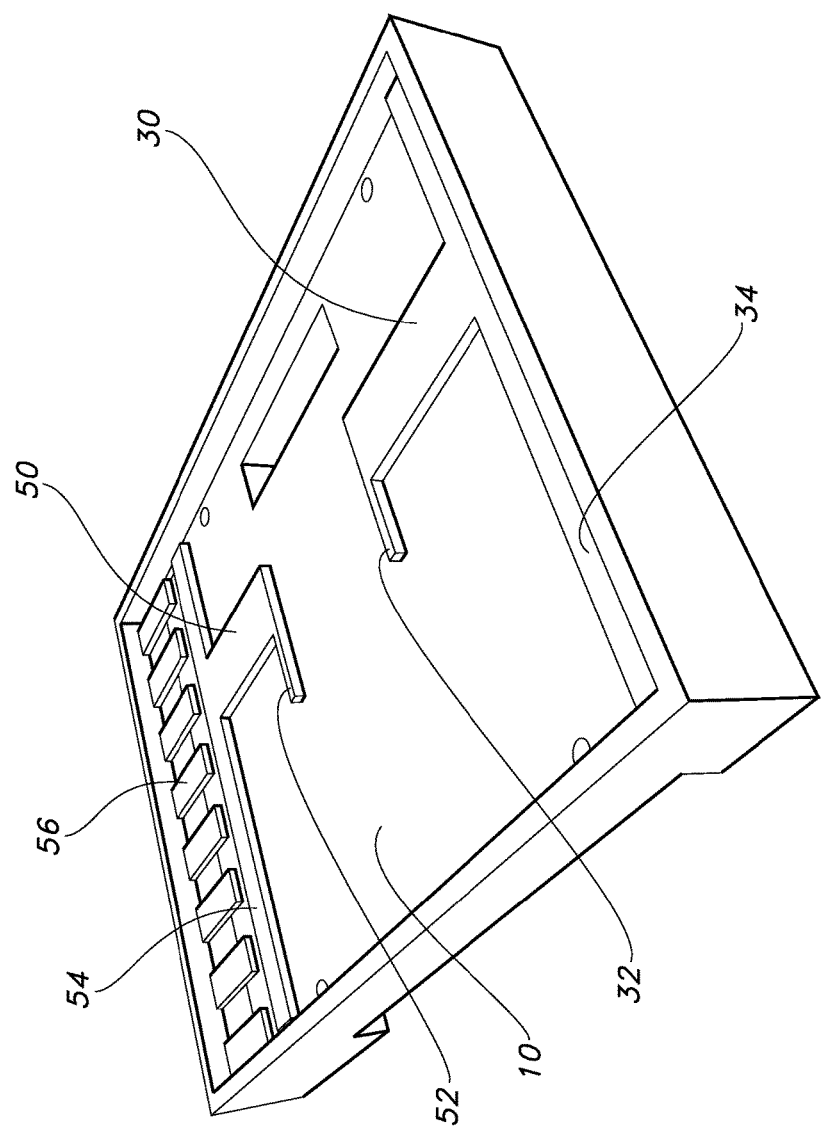
FIG. 6 is a bottom perspective view of the device.

The electrical connectors 30, 50 are affixed to the housing 10 using any suitable conventional means. The first connector 30 has a tab 32 that protrudes upward through the housing 10 and is positioned to contact the negative terminal on the battery. FIG. 5 illustrates the connector 30 extending from the tab 32 beneath the housing 10 to a conductive bus bar 34, hereinafter referred to as a negative bus bar 34, that is affixed to one side of the device housing 10. The second connector 50 has a tab 52 that protrudes upward through the housing 10 and is positioned to contact the positive terminal on the battery. The positive tab 52 extends beneath the housing 10 to a second conductive bus bar 54, hereinafter referred to as the positive bus bar 54, located on the side of the housing 10 opposite the negative bus bar 34. The positive bus bar 54 has a plurality of clip connectors 55, as shown in FIG. 7.

Figure 7:
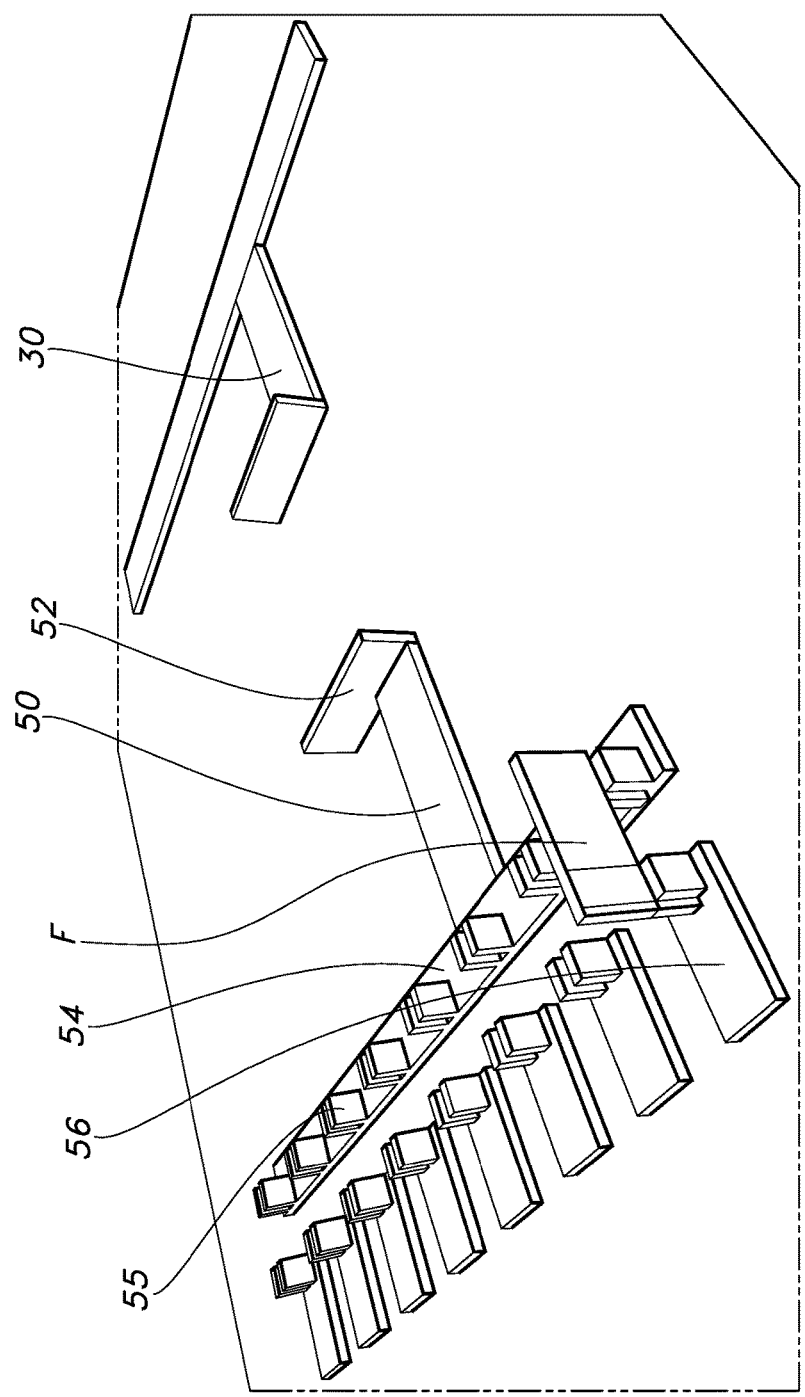
FIG. 7 is a perspective view of a fuse connected to the positive electrical connector.

The clip connectors 55 and a plurality of clip openings 16, shown in FIGS. 1-4, in the housing 10 allow access to the positive bus bar 54 so that one side of a conventional fuse F may be inserted into the device, as shown in FIG. 7. A plurality of fuse clips 56 that are electrically isolated from the other electrically conductive components are provided for attachment to the other side of the fuse F. Inserting a fuse F into clips 55 and 56 electrically connects the positive bus bar 54 to the isolated conductive clip 56.

Figure 8:
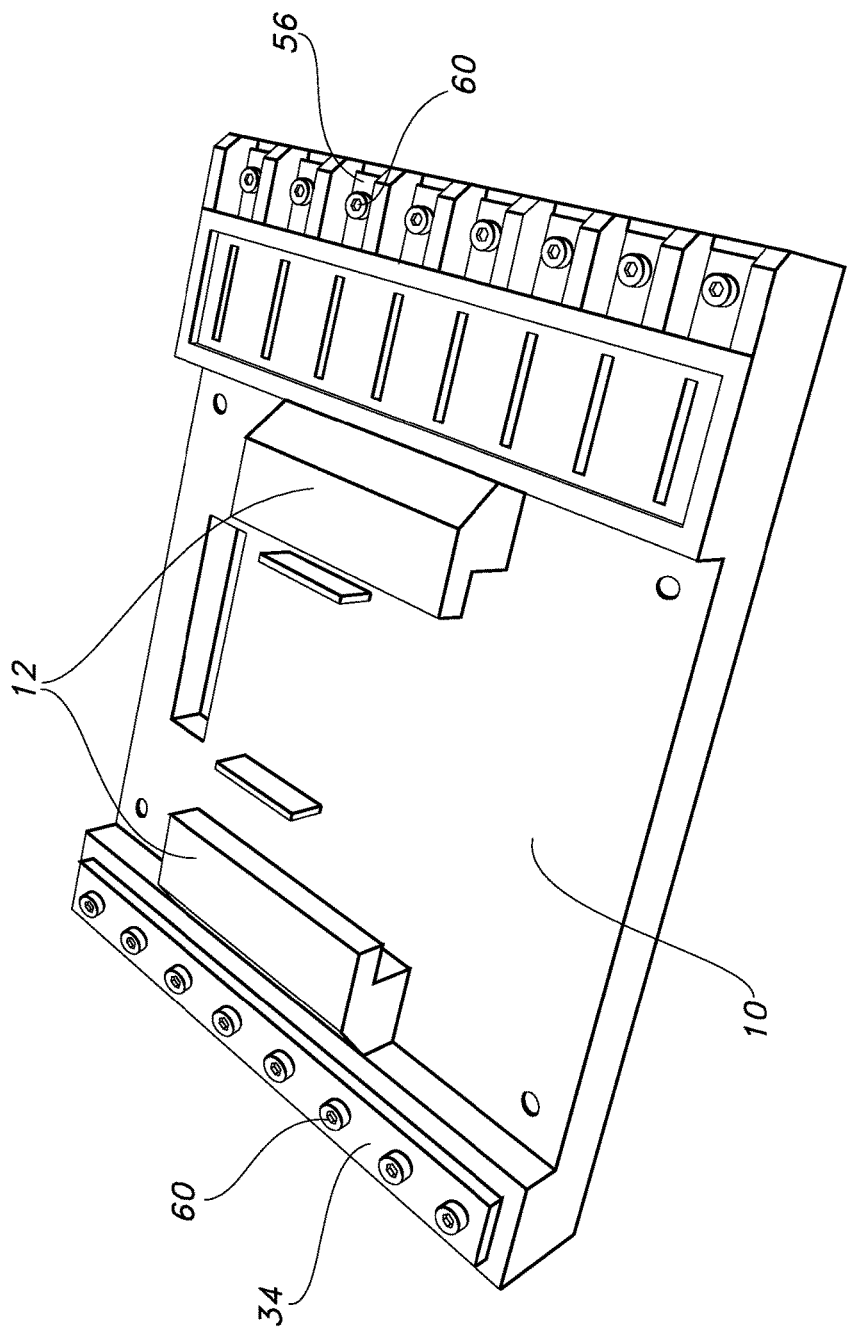
FIG. 8 is a top perspective view of a device showing accessory connectors.

Conventional connectors 60, such screw terminals shown in FIG. 8, are attached to the negative bus bar 34 and to the isolated conductive clips 56 so as to allow the accessory devices A power cords or cables to be attached to the device 100. Specifically, a low voltage direct current accessory having a power cable may be connected to the power distribution device 100 by connecting its negative wire to the connector 60 on negative bus bar 34 and its positive wire to one of the connectors 60 on conductive clips 56.

The fuse F for each circuit is sized appropriately for the accessory that is in the same circuit, so as to provide adequate over-current protection. In the event of an increase in amperage beyond the rating of fuse F, the connection between positive bus bar 54 and conductive clip 56 will open and current flow will stop, preventing damage to the accessory, the wires, or the battery.

In some instances where a more durable connection is required, the accessory device wires may be soldered directly to the bus bars 34, 54.

Figure 12:
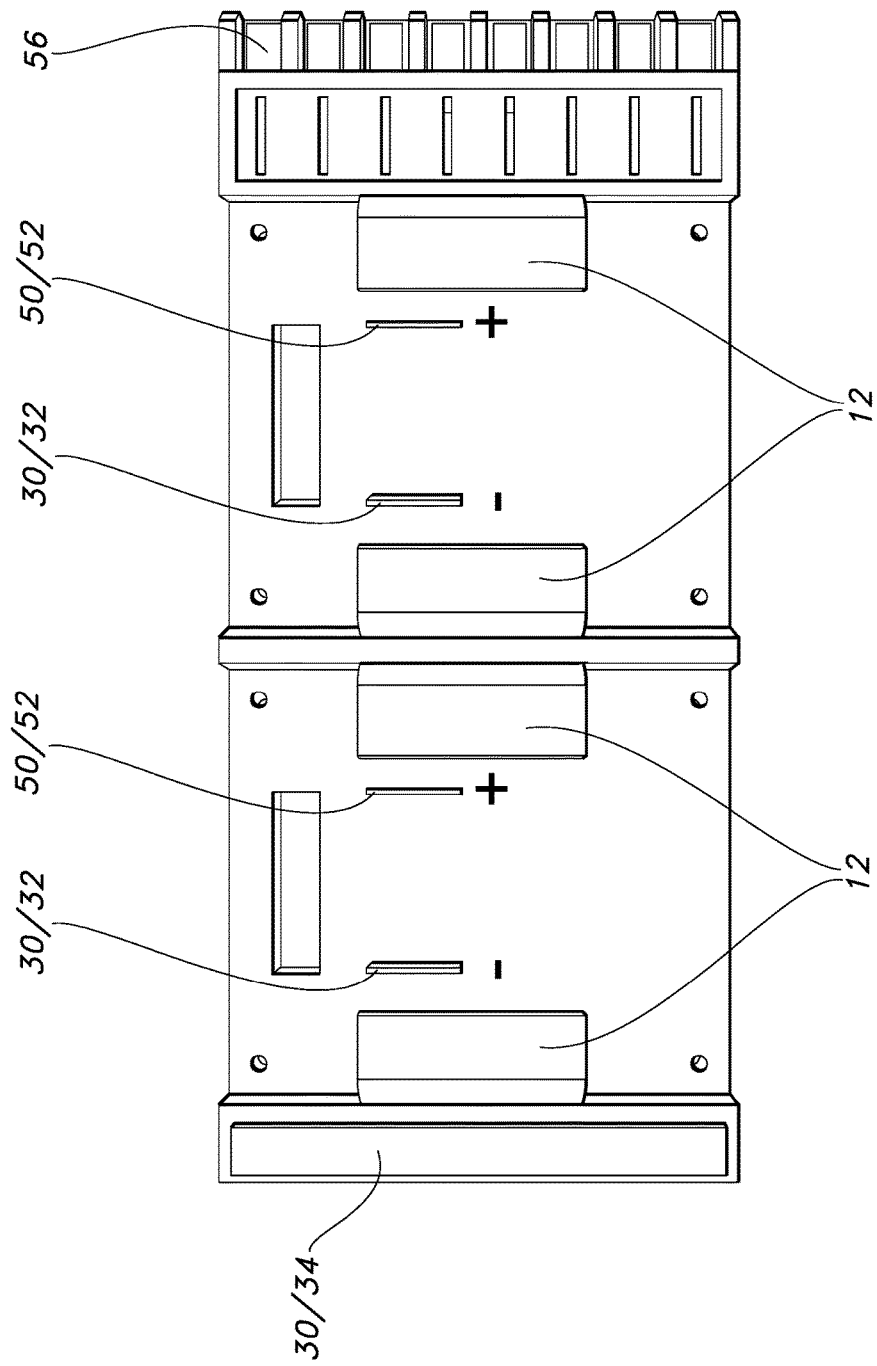
FIG. 12 is a top view of the device that holds two batteries.
Figure 13:
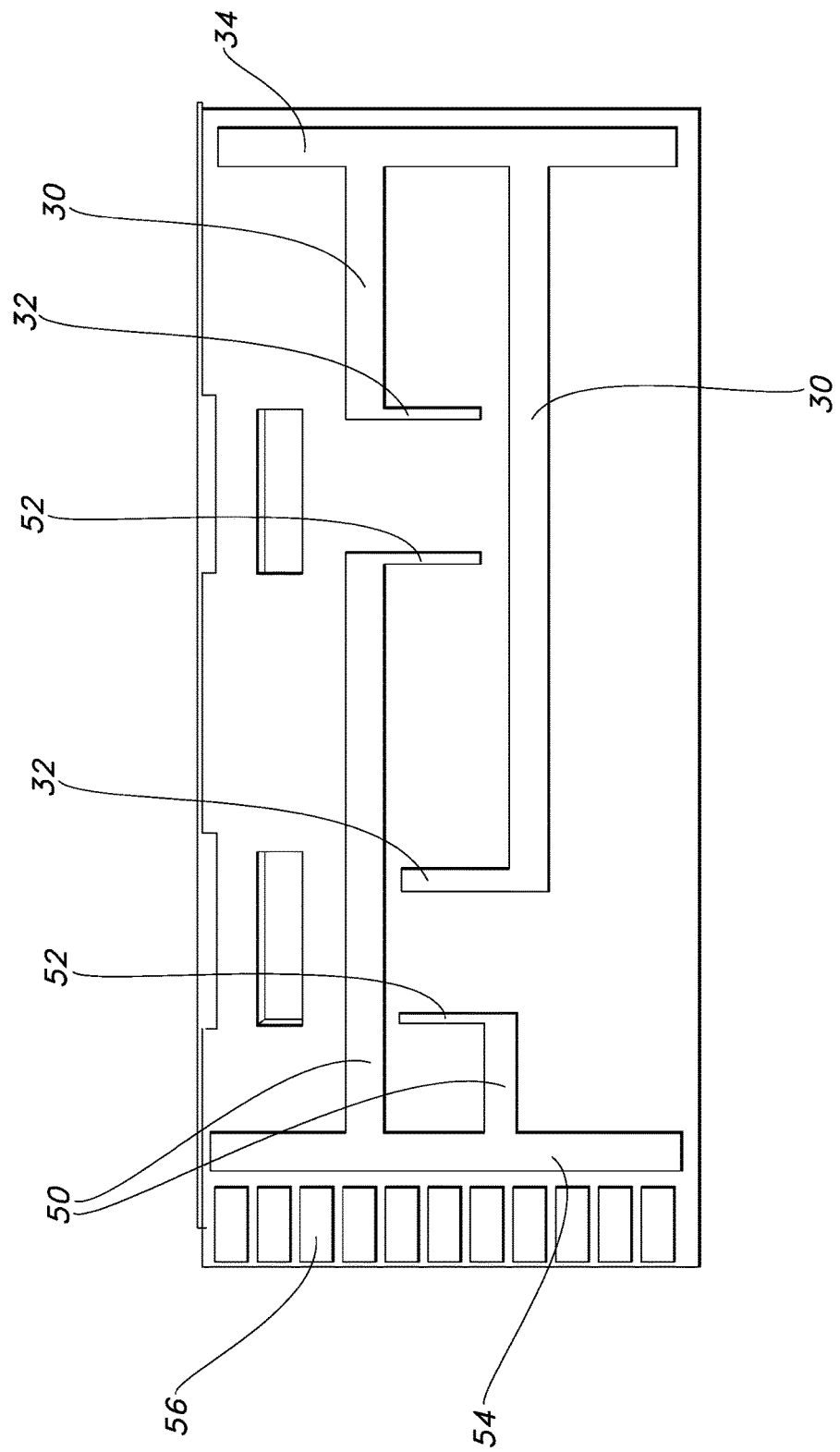
FIG. 13 is a bottom view of the device that holds two batteries.

FIGS. 12 and 13 illustrate an embodiment of the device 100 that is able to attach to multiple batteries at the same time. In this embodiment, additional battery connectors 12 and additional electrical connectors 30, 50 are added for each battery. The embodiment shown in the figures illustrates a configuration for two batteries; however, additional batteries could be added in a similar manner.

There are a variety of commercially available batteries that may be suitable, for example the MAKITA® BL1830 18v lithium ion rechargeable battery or the BLACK & DECKER® 12v Nickel Cadmium Power Tool Battery, each of which are secured by similar attachment clips. The battery connector 12 may also be in the form of a socket so as to attach to portable batteries such as the MILWAUKEE 48-11-2401 M12 Lithium 12-volt battery.

A back cover (not shown) made of a non-conductive material may also be provided.

Figure 9:
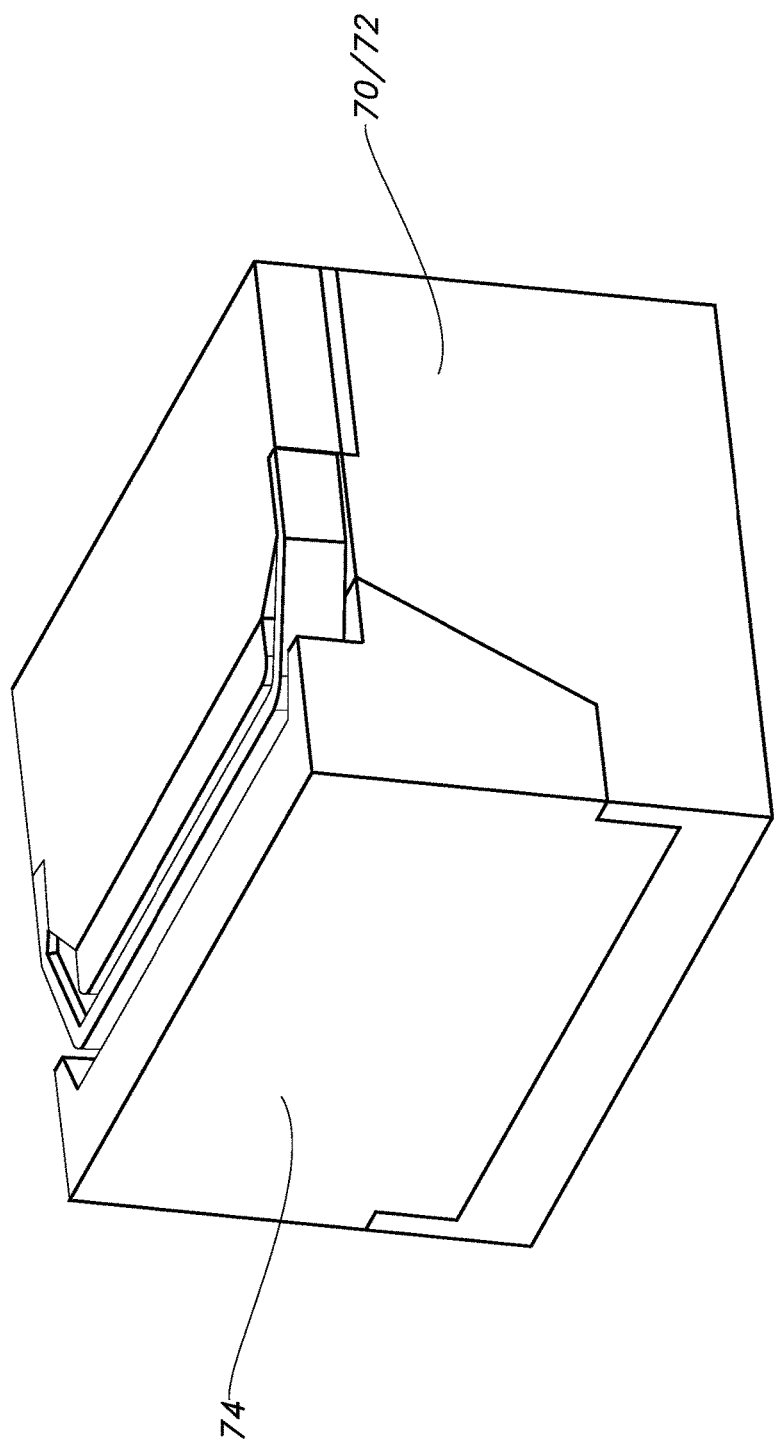
FIG. 9 is a front perspective view of the device housing.
Figure 10:
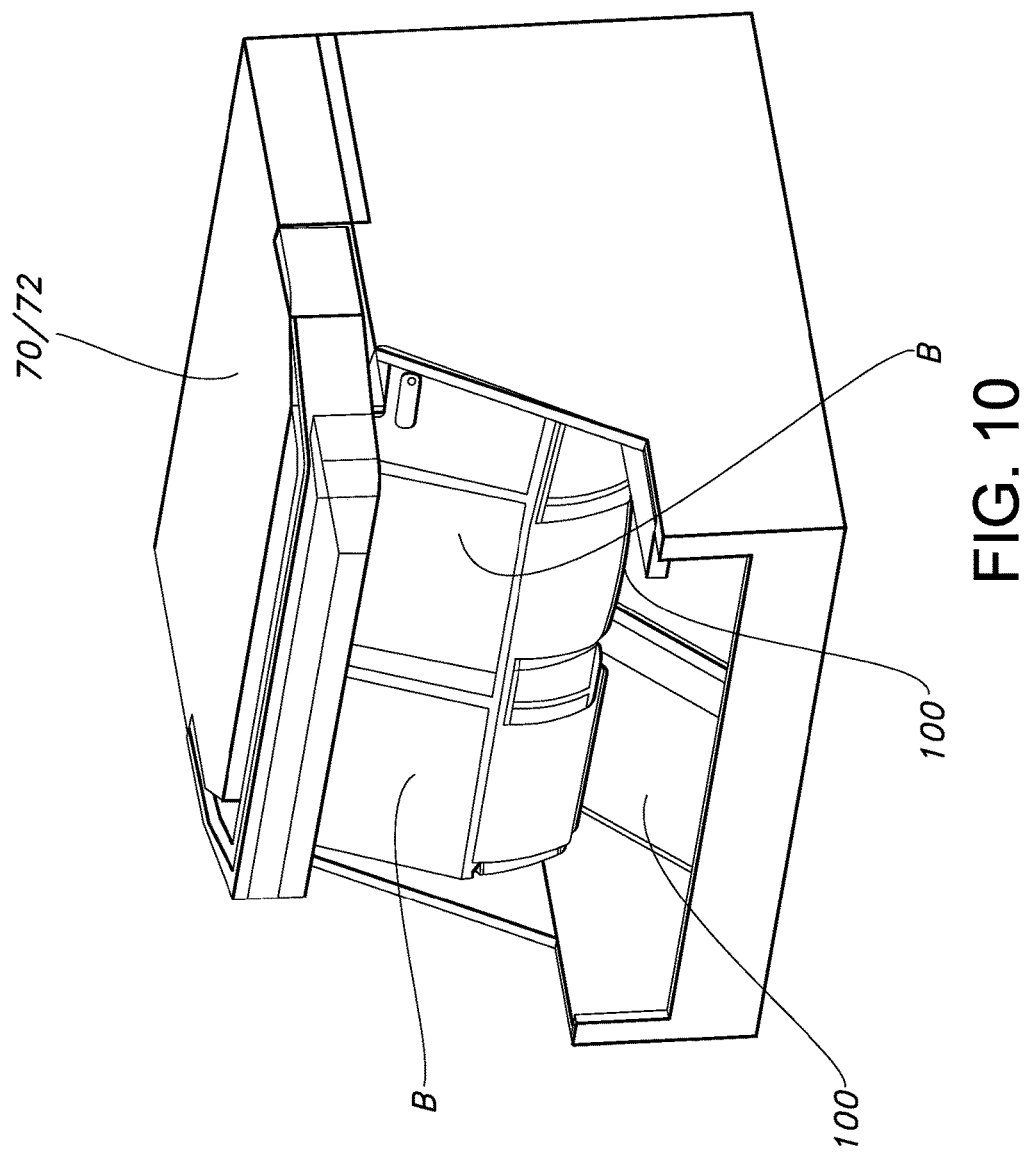
FIG. 10 is a front perspective of the device housing without the cover.
Figure 11:
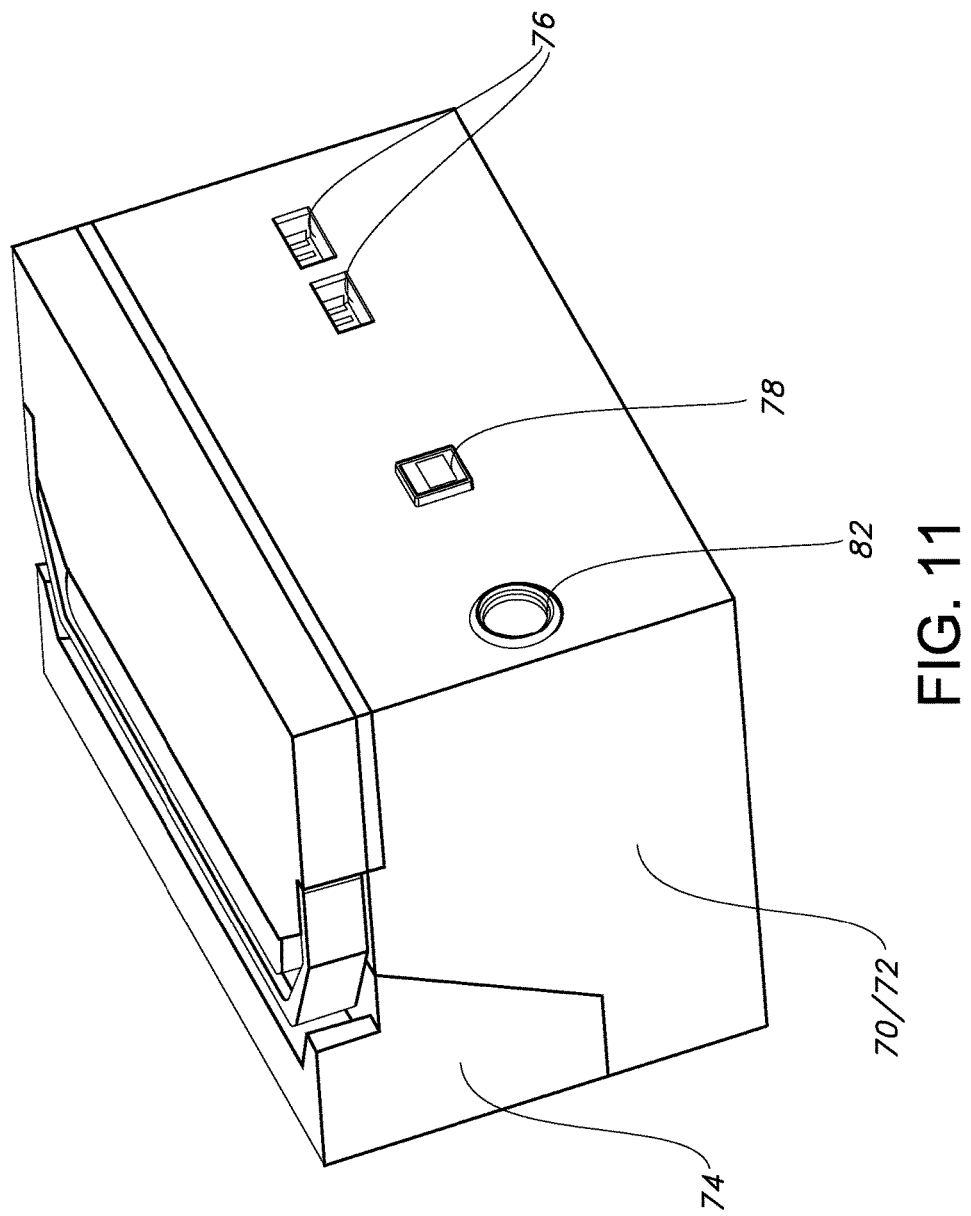
FIG. 11 is a rear perspective view of the device housing.

An outer device housing 70 may also be provided, as shown in FIGS. 9-11. In this embodiment, the outer housing is a water-tight or water resistant box 72 with a water-tight or water resistant cover 74 that is openable so as to allow the user to insert the battery. The outer device housing 70 may be comprised of any suitable material that is resistant to water, such as, for example, plastic or fiberglass. The outer device housing 70 in the embodiment shown is designed house 2 batteries B, so as to allow for more electrical power and, potentially, to connect to additional devices. Openings 76 are provided in the rear of the housing to allow accessory devices A to be connected to the positive and negative bus bars, 34, 54, as previously described.

A plurality of universal serial bus (USB) connectors 78 are placed in the outer housing 70 and attached to the device 100 using conventional connectors (not shown) so as to allow a user to connect USB powered accessories to the battery. A cylindrical 12 volt accessory socket 82, such as ones historically associated with cigarette lighter plugs in automobiles, is also contained in the housing and connected to the device 100 using conventional means. Both connectors 78, 82 are connectable to the bus bars 30, 50, using a number of conventional means, such as with screw terminals or by being soldered directly to the respective bars 34, 54.

It is understood that the embodiments described herein are merely illustrative of the present invention. Variations in the construction of the power distribution device may be contemplated by one skilled in the art without limiting the intended scope of the invention herein disclosed and as defined by the following claims.

What is claimed is:

1. A power distribution device for use with a portable rechargeable battery and accessory devices, the power distribution device comprising:

a device housing having a battery connector for securing the portable rechargeable battery;

a negative bus bar that is affixed to the device housing having a plurality of connectors for connecting to the accessory devices;

a positive bus bar that is affixed to the device housing having a plurality of connectors for connecting to the accessory devices;

a first electrical connector that is affixed to the device housing, the first electrical connector having a tab that is positioned to contact the negative terminal on the portable rechargeable battery, and that extends from the tab to the negative bus bar;

a second electrical connector that is affixed to the device housing, the second electrical connector having a tab that is positioned to contact the positive terminal on the portable rechargeable battery, and that extends from the tab to the positive bus bar; and wherein attaching the portable rechargeable battery to the device housing and connecting the accessory devices to the negative bus bar and positive bus bar provides the accessory devices with electricity.

2. The power distribution device of claim 1, wherein the first electrical connector is affixed to the bottom of the device housing and the first electrical connector's tab protrudes upward through the device housing to contact the negative terminal on the portable rechargeable battery and wherein the second electrical connector is affixed to the bottom of the device housing and the second electrical connector's tab protrudes upward through the device housing to contact the positive terminal on the portable rechargeable battery.

3. The power distribution device of claim 2, wherein the device housing has one or more attachment openings to affix the device to another structure.

4. The power distribution device of claim 3, further comprising one or more clip connectors being affixed to the positive bus bar, and one or more fuses, each fuse having two sides, and one or more fuse clips that are electrically isolated from the other electrically conductive components; and wherein one side of each fuse is connectable to one of the clip connectors and the other side of the fuse is connectable to the fuse clip so as to provide over-current protection to the portable rechargeable battery and the accessory devices.

5. The power distribution device of claim 4, further comprising an outer device housing and wherein the power distribution device housing is secured within the outer device housing.

6. The power distribution device of claim 5 wherein the outer device housing is water resistant so as to prevent water from reaching the rechargeable battery.

7. The device of claim 6 wherein the outer device housing includes universal serial bus connectors that are attached to the positive bus bar and the negative bus bar.

8. The device of claim 7 wherein the outer device housing includes one or more accessory sockets that are attached to the positive bus bar and the negative bus bar.

9. The device of claim 8 wherein the outer device housing includes one or more openings that allow the accessory devices to be attached to the positive-charge bus bar and the negative-charge bus bar.

10. A power distribution device for use with a plurality of portable rechargeable batteries, the device comprising:

a device housing having a battery connector for each of the plurality of portable rechargeable batteries, each connector capable of securing a portable rechargeable battery;

a negative bus bar affixed to the device housing having a plurality of connectors for electrical devices;

a positive bus bar affixed to the device housing having a plurality of connectors for electrical devices;

a plurality of negative electrical connectors, each negative electrical connector having a tab that is positioned to contact the negative terminal on one of the portable rechargeable batteries, the tab extending beneath the device housing to the negative bus bar; and a plurality of positive electrical connectors, each positive electrical connector having a tab that is positioned to contact the positive terminal on one of the plurality of portable rechargeable batteries, the tab extending beneath the device housing to the positive bus bar; and wherein accessory devices are attachable to the negative bus bar and positive bus bar.

* * * * *